United States Patent [19]

Barton et al.

[11] 3,883,172

[45] May 13, 1975

[54] VEHICULAR SEAT MOUNTING LINKAGE

[75] Inventors: James C. Barton, Peoria; James P. Mueller, East Peoria, both of Ill.; John W. Carter, Davenport, Iowa

[73] Assignee: Caterpillar Tractor Company, Peoria, Ill.

[22] Filed: July 2, 1973

[21] Appl. No.: 375,483

[52] U.S. Cl. .................................................. 296/65
[51] Int. Cl. ............................................. A47c 3/22
[58] Field of Search ............................... 296/63–65; 297/307, 345; 248/399, 400

[56] References Cited
UNITED STATES PATENTS

| | | | |
|---|---|---|---|
| 3,150,855 | 9/1964 | Carter et al. | 248/400 |
| 3,412,967 | 11/1968 | Swenson et al. | 248/400 |
| 3,572,828 | 3/1971 | Lehner | 248/399 |

*Primary Examiner*—Stanley H. Tollberg
*Attorney, Agent, or Firm*—Phillips, Moore, Weissenberger, Lempio & Strabala

[57] ABSTRACT

A seat assembly for use in a variety of vehicles, particularly to isolate an operator from oscillatory movements on the vehicle, the operator's seat being arranged for movement relative to a remote point located below and in longitudinally spaced apart relation from the seat assembly, preferably by means of forward and rearward links pivotably mounting the seat upon a base structure, the rearward link having an effectively greater length than the forward link. A novel fluid circuit is also provided to resiliently resist movement between the seat and a supporting base structure.

13 Claims, 3 Drawing Figures

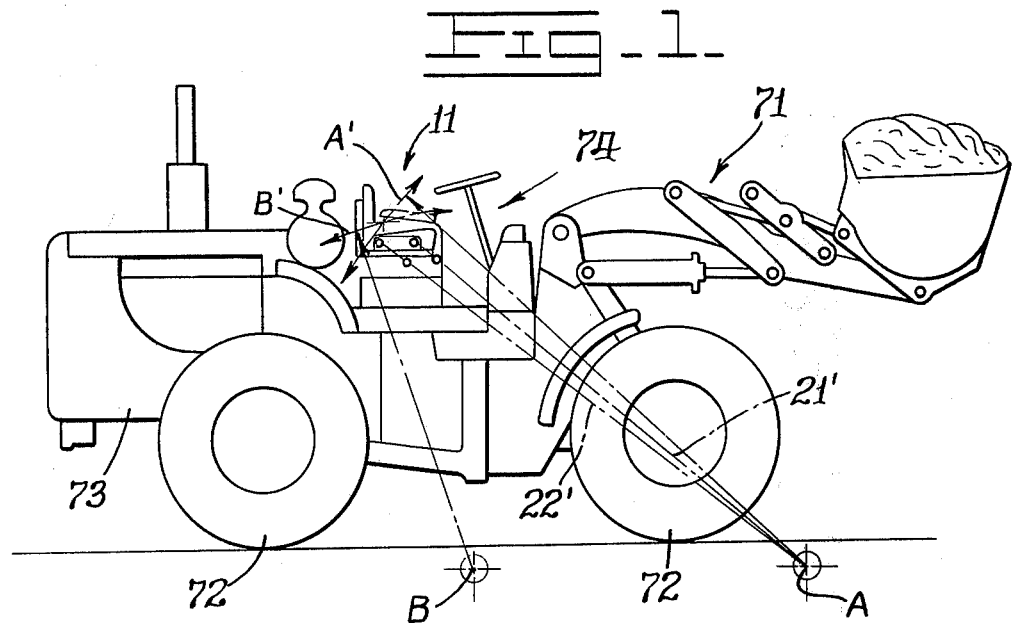
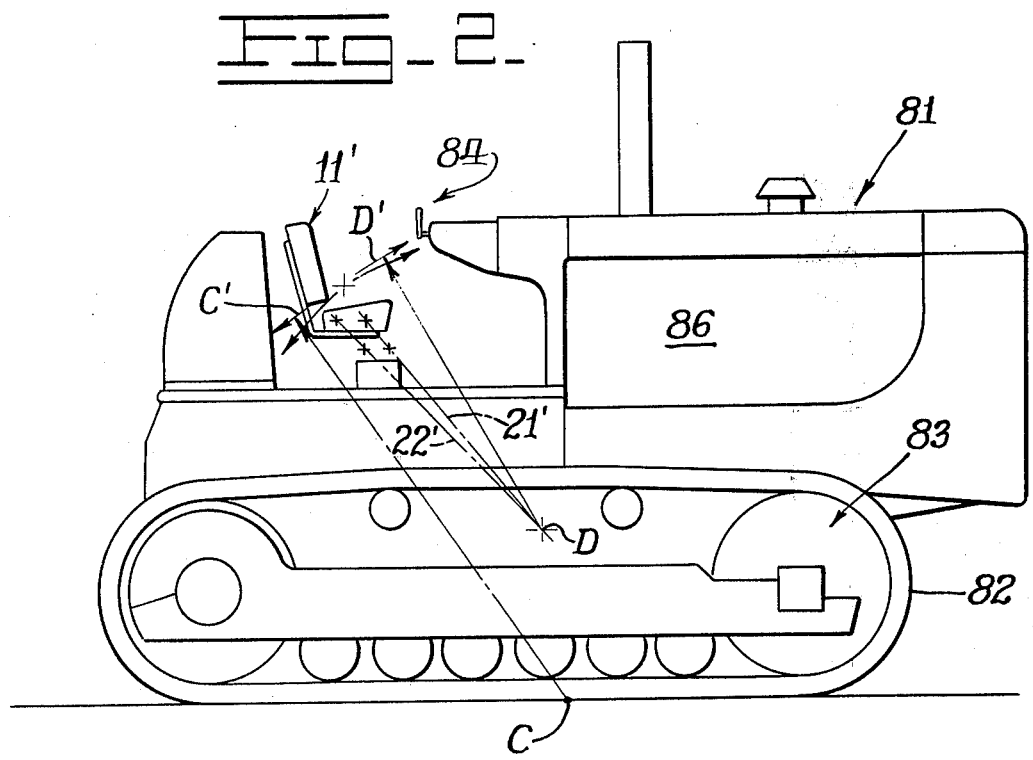

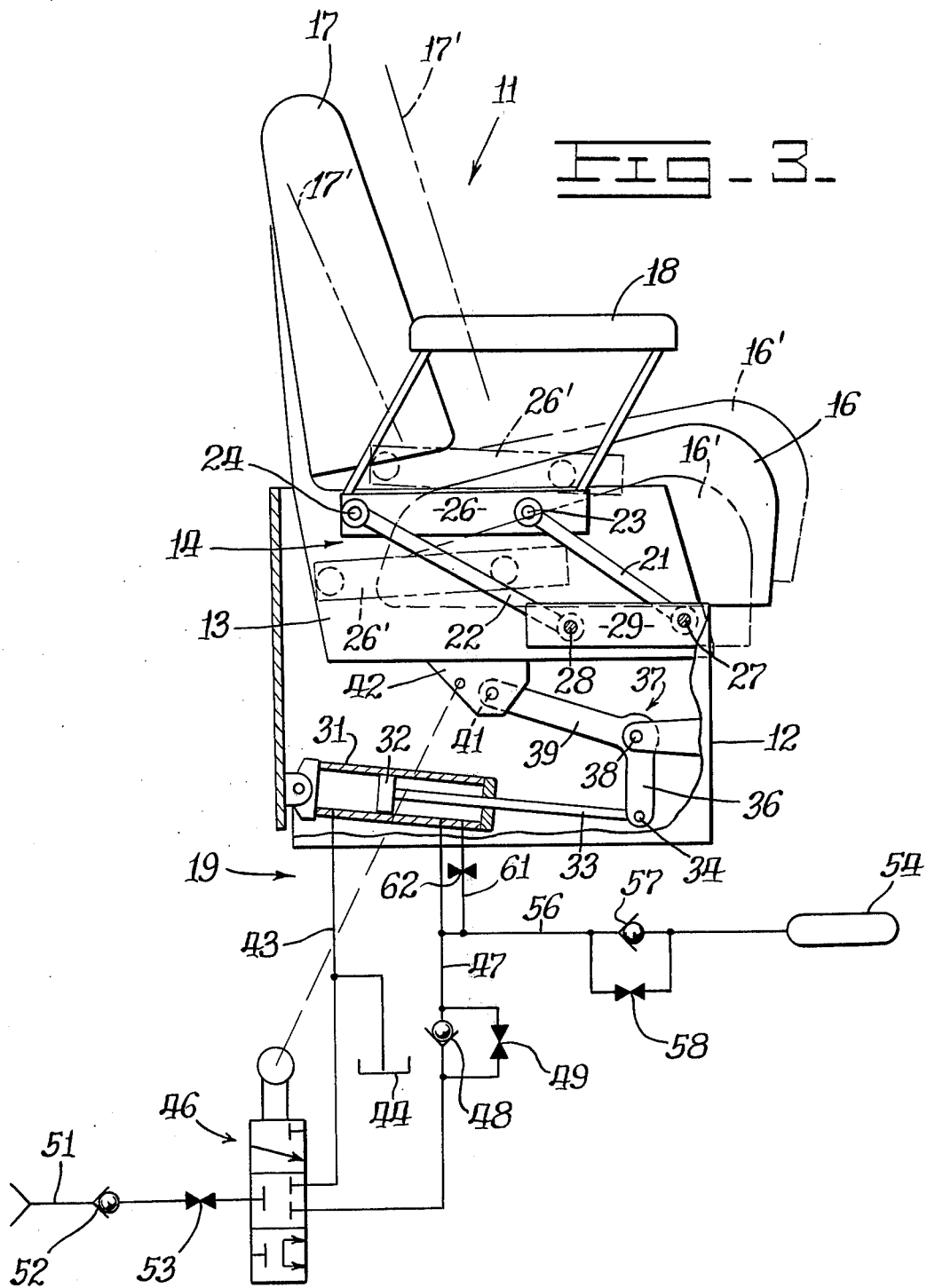

VEHICULAR SEAT MOUNTING LINKAGE

BACKGROUND OF THE INVENTION

The present invention is directed toward an operator seat assembly which may be adapted for use with a large variety of vehicles. More particularly, the invention is directed toward a seat assembly having an interconnecting linkage movably supporting a seat frame in a manner to better isolate the operator from oscillatory movement in a longitudinal and vertical plane of the vehicle.

The prior art provides numerous examples of interconnecting linkages and resilient mounts for supporting an operator's seat frame upon a vehicle and isolating an operator from various forms of vehicular motion.

There are many types of motion in vehicles which may be transmitted to the operator. The types of motion occurring in a particular vehicle depend upon numerous characteristics. For example, most vehicles tend to experience vertical bounce as well as side-to-side or lateral pitching. These types of motion, however, tend to develop more in response to the particular terrain over which a vehicle is operating rather than particular characteristics of the vehicle itself. Accordingly, vehicular motions such as vertical bounce and lateral pitch do not tend to continue in predictable or repeated patterns allowing design of a seat assembly to isolate the operator from those motions.

The present invention is particularly concerned with vehicular motion of a type which does appear to be dependent upon characteristics of the vehicle itself. Thus, a seat assembly may be designed according to the present invention to particularly isolate an operator from motion characteristic to a specific vehicle.

The type of motion contemplated by the present invention may be generally classified as oscillatory movement of the vehicle in a vertical plane passing longitudinally through the vehicle. This type of motion is, of course, partly dependent upon terrain over which the vehicle is operating. However, it has been found that such oscillatory movement of the vehicle while travelling over various types of terrain tends to be determined in large part by characteristics of the vehicle itself.

Even for this specific type of motion, there may be substantial variation in the particular mode of oscillation, depending upon the type of vehicle with which the seat assembly is to be employed. For example, vehicles having pneumatic tires will experience oscillatory movement which differs substantially from that for a vehicle having non-resilient wheels or a track-laying vehicle, for example. Additional differences tend to arise, for example, between a vehicle having a number of ground engaging wheels as compared, for example, to a conventional track-laying vehicle which has ground engaging means substantially along its entire length. Still further, such oscillatory movement within the vehicle may also differ depending upon load distribution for the vehicle as well as contemplated operating speed ranges. Generally, oscillatory movement of the type referred to herein tends to become more pronounced or severe during higher speeds of operation.

Vehicular characteristics of the type described immediately above may be predicted for any particular type of vehicle intended for a preferred application. As noted above, the present invention is particularly intended to provide a seat assembly for isolating an operator from these sources of oscillatory movement in a vehicle.

The present invention is particularly concerned with isolating the operator from oscillating movement in a longitudinal, vertical plane because it is believed to be most objectionable to the operator and thus most likely to interfere with efficient operation. Further, although the seat assembly of the present invention is particularly designed for minimizing the effects of such vehicular motion upon the operator, it will be obvious from the following description that the seat assembly of the present invention also tends to isolate the operator from other types of motion, particularly vertical bounce. The seat assembly also tends to permit limited response to lateral pitch of the vehicle, at least to the extent that vertical motion is produced in the vehicle.

SUMMARY OF THE INVENTION

Accordingly, it is a primary object of the present invention to provide a seat assembly wherein a seat frame for supporting an operator is mounted by means of an inter-connecting linkage designed to permit movement of the seat frame about an imaginary point selected substantially below and in longitudinally spaced apart relation from the seat assembly, the imaginary point being selected with particular reference to the type of vehicle with which the seat assembly is to be employed.

It is a further object of the invention to provide such a mounting arrangement in a seat assembly wherein the seat frame is supported by forward and rearward links having linear axes tending to converge at a relatively remote point located below and in longitudinally spaced apart relation from the seat assembly.

It is a still further object of the invention to provide such a seat assembly wherein the rearward link has an effectively greater length than the forward link.

It is yet another object of the present invention to provide a fluid circuit of a type for resiliently resisting relative movement between a seat frame and a base structure, said circuit being described in conjunction with an interconnecting linkage of the type referred to above.

Additional objects and advantages of the present invention are made apparent below having reference to the accompanying drawings.

DESCRIPTION OF THE DRAWINGS

FIG. 1 is a side view in elevation of a wheeled vehicle preferably embodied as an earth-moving bucket loader, the seat assembly of the present invention being adaptable for use with such a vehicle.

FIG. 2 is a side view in elevation of a substantially different type of vehicle, such as a track-laying tractor, the seat assembly of the present invention also being adaptable for use with vehicles of this type.

FIG. 3 is a side view in elevation of a seat assembly constructed according to the present invention, particular features of the seat assembly being adaptable for use with a variety of vehicles, the seat assembly of FIG. 3 also including a fluid circuit for resiliently resisting relative movement between a seat frame and a base structure.

DESCRIPTION OF THE INVENTION

A seat assembly constructed according to the present invention for use with various vehicles, such as those illustrated in FIGS. 1 and 2, is described below with reference to FIG. 3. Referring to that drawing, an operator seat assembly 11 includes a base structure 12 which may be secured for example to one of the vehicles illustrated respectively in FIGS. 1 and 2. A seat frame 13 is movably supported relative to the base structure 12 by means of an interconnecting linkage arrangement generally indicated at 14. The seat frame 13 includes a seat cushion 16, a back cushion 17 and suitable arm rests such as that indicated at 18.

Within the seat assembly, as illustrated in FIG. 3, the backrest 17 is contemplated as being supported in fixed relation to the seat cushion 16. However, the present invention is particularly directed toward providing a selected response of the seat cushion 16 to longitudinally oscillating movement of a vehicle and the base structure 12. Accordingly, the back rest 17 could also be pivoted with respect to the seat cushion 16 within the scope of the present invention.

The seat assembly of FIG. 3 also includes a fluid circuit 19 which is effectively interconnected between the seat frame 13 and the base structure 12 to resist relative movement therebetween in a manner described in greater detail below.

The interconnecting linkage 14 includes forward and rearward links 21 and 22 respectively. These links are pivotably connected at 23 and 24 to a support bracket 26 which is attached to the seat frame 13. The opposite ends of the links 21 and 22 are pivotably connected at 27 and 28 to another support bracket 29 which is secured to the base structure 12.

It may be seen that the forward and rearward links 21 and 22 together with the interconnecting portions of the brackets 26 and 29 respectively associated with the seat frame and base structure provide a quadrilateral support for the seat frame 13. Those components are arranged upon one side of the seat frame 13 with a similar linkage arrangement contemplated upon the other side of the seat frame as well.

The particular configuration of the quadrilateral formed by the links 21, 22 and the brackets 26, 29 is preselected according to the present invention with reference to a vehicle with which the seat assembly is to be employed for particularly isolating an operator from oscillating movement arising longitudinally within a particular vehicle. To accomplish that function, the interconnecting linkage 14 is selected to permit longitudinal movement of the seat about a relatively remote point located substantially below and in longitudinally spaced apart relation from the seat assembly 11. The rearward link 22 is selected to have a greater effective length between the seat frame 13 and the base structure 12 as compared to the forward link 21. This difference in length for the two links 21 and 22 causes the quadrilateral formed by the links together with the brackets 26 and 29 to be unsymmetric. The quadrilateral may be in the form of a trapezoid, at least when the seat frame is positioned with the bracket 26 being parallel to the bracket 29. However, the difference in length between the two links 21 and 22 prevents the quadrilateral from assuming a conventional parallelogram form.

The particular configuration of the quadrilateral for a seat assembly adapted for use with a particular vehicle is described below with respective reference to FIGS. 1 and 2. However, before referring to those figures, it is noted that the seat frame 13 is illustrated in FIG. 3 as being loaded by the weight of an average operator. Accordingly, it is to be kept in mind that the particular configuration of the quadrilateral primarily determined by the two links 21 and 22 is described below in such a loaded condition. As was noted above, the fluid circuit 19 tends to resist relative movement between the seat frame 13 and the base structure 12. However, as relative motion is transmission from a vehicle into the seat assembly, the seat frame 13 tends to move or oscillate from its solid line position into various positions where portions of the seat frame are illustrated by phantom lines and indicated by primed numerals.

The fluid circuit 19 is described below as particularly including hydraulic components. However, within the scope of the present invention, the circuit 19 might also be adapted for use with other fluids, for example, in a pneumatic type circuit. The circuit 19 includes a cylinder 31 within which a piston 32 is movable in correlation with relative motion between the seat frame 13 and the base structure 12. To adapt the cylinder 31 for relatively spacing between the seat frame 13 and the base structure 12, the piston has a rod 33 which penetrates the rod end of the cylinder 31 and is pivotably connected at 34 to one lever 36 of a bellcrank structure 37 with a central pivot 38 being established relative to the base structure 12. A longer lever 39 of the bell crank 37 is pivotably connected at 41 to a bracket 42, which is secured to the seat frame 13.

With the bell crank arrangement as illustrated in FIG. 3, downward motion of the seat frame 13 causes movement of the piston 32 toward the rod end of the cylinder 31 while upward movement of the seat frame 13 conversely drives the piston 32 toward the head end of the cylinder 31. The circuit 19 also includes a first conduit 43 which communicates with the head end of the cylinder 31, a fluid drain as indicated at 44 and a three-position control valve illustrated at 46. Another conduit 47 communicates the rod end of the cylinder 31 with the valve 46 by means of a one-way check valve 48 and a parallel restrictive orifice 49. Fluid under pressure from a source (not shown) is communicated to the valve 46 by means of a conduit 51, including a one-way check valve 52 and a restrictive orifice 53 arranged in series.

A fluid accumulator of conventional design and illustrated at 54 is communicated by means of a branch conduit 56 with the conduit 47 at a point between the cylinder 31 and the parallel arrangement of the check valve 48 and restrictive orifice 49. The conduit 56 also includes a similar one-way check valve 57 and a restrictive orifice 58 arranged in parallel relation.

The cylinder 31 and the accumulator 54 cooperate to provide the desired resilient suspension of the seat frame 13 relative to the base structure 12. Another branch conduit 61 is also in communication with the cylinder 31 closely adjacent its rod end, the conduit 61 including another restrictive orifice 62. The orifice 62 serves as a cushion when the piston 32 closely approaches the rod end of the cylinder 31 since fluid exhausted from the cylinder must pass through the restrictive orifice 62 rather than being in substantially free communication with the conduit 56 by means of the conduit 47. Thus, the restrictive orifice 62 serves as a fluid cushion for increasing resistance to downward travel of the seat frame 13 as it approaches closer to the base structure 12.

The valve 46 is operatively coupled to the seat frame 13, preferably by means of the bracket 42 as indicated in FIG. 3. This permits the valve 46 to be automatically positioned in response to the instant location of the seat frame 13 relative to the base structure 12. For example, with the seat frame in a generally centered position, as illustrated by solid lines in FIG. 3, the valve 46 is centrally positioned to hydraulically block both of the conduits 43 and 47.

The valve 46, in combination with the restrictive orifices 49 and 53, tends to provide for automatic leveling of the seat frame 13. For example, as the seat frame moves downwardly, fluid is exhausted from the rod end of the cylinder 31 and communicated across the check valve 57 to the accumulator 54. The valve 46 also tends to be shifted downwardly from the position illustrated in FIG. 3 so that additional fluid from the conduit 51 may be communicated to the rod end of the cylinder 31 across the check valve 48 at a rate determined primarily by the restrictive orifice 53. Accordingly, the additional fluid under pressure introduced into the conduit 47 tends to return the seat to the level position illustrated in FIG. 3.

As the seat rises above the solid line position illustrated in FIG. 3, fluid from the accumulator 54 is allowed to re-enter the rod end of the cylinder 31 at a rate determined primarily by the restrictive orifice 58. Additionally, the valve 46 tends to be shifted in an upward direction as viewed in FIG. 3, thus placing the conduit 47 in communication with the head end of the cylinder 31 by means of the conduit 43. However, fluid flow through the conduit 47 toward the conduit 43 is restricted by the orifice 49 in order to limit upward travel of the seat.

Referring now to FIG. 1, as well as FIG. 3, the configuration of the quadrilateral formed by the two links 21, 22 and the brackets 26, 29 is described below in order to adapt the seat assembly for use with the specific vehicle illustrated in FIG. 1. Referring particularly to FIG. 1, it may be seen that the linear or longitudinal axes for the links 21 and 22, shown by broken lines 21' and 22', tend to converge at a relatively remote point indicated at A located substantially below and in longitudinally spaced apart relation from the seat assembly 11. That point A is referred to as an oscillation point for the loader vehicle 71. As may be seen in FIG. 1, the loader vehicle 71 includes a plurality of ground engaging, pneumatic tires 72 for supporting the vehicle body 73. The seat assembly 11 is arranged generally toward the longitudinal center of the body 73 is an operator station indicated at 74.

The oscillation point A for such a vehicle may be determined with relative precision by use of a complex formula involving the spring rate for the tires 72, the weight distribution of the vehicle 71, its wheel base and moment of inertia, etc. Such a determination results in two modes or points of oscillation. The point A referred to above is longitudinally removed from a central portion of the vehicle and serves as a reference point about which vertical bounce of the machine tends to occur. Another oscillation point B is centrally disposed along the length of the vehicle and determines the inherent pitch characteristic of the vehicle. The point A is of particular concern to the present invention and may be seen as representing a point with reference to the vehicle which experiences relatively limited vertical movement during travel of the vehicle. Since the axes of the two links 21 and 22 tend to converge at the point A, motion of the seat frame 13 tends to be restricted to movement along an arc A' struck about the oscillation point A. Thus, the interconnecting linkage 14 ideally conditions the seat frame 13 for response to movement of the vehicle about the oscillation point A, an operator thus having increased isolation from such movement of the vehicle.

An additional arc B' is also illustrated as being struck about the second oscillation point B. It may be seen from correlation of the two arcs A' and B' that the particular interconnecting linkage arrangement 14 also tends to isolate the operator from movement of the vehicle about the oscillation point B. Further, it may be seen that the arc A' for the seat has both a vertical and a longitudinal component. Thus, the seat suspension tends to isolate the operator with respect to simple vertical bounce of the machine, as well as with respect to longitudinal forces acting upon the vehicle, such as acceleration and deceleration forces.

A similar seat assembly 11' is also illustrated as being particularly adapted for use with a crawler tractor of the type indicated at 81 in FIG. 2. The crawler tractor 81 includes an endless track 82 trained about a tracklaying mechanism 83 for engagement with the ground. An operator station 84 within which the seat assembly 11' is arranged is disposed toward one end of the body 86 for the tractor 81.

Within a track-laying vehicle of the type illustrated in FIG. 2, oscillatory movement of the vehicle in a longitudinal plane tends to occur about a point C, commonly referred to as tipping point, and located generally at ground level directly beneath the center of gravity for the entire vehicle 81. Within such a vehicle, it is believed obvious that oscillation in a longitudinal plane of the vehicle arises primarily as the track 82 passes over rocks or other uneven features of terrain. Because of this operating characteristic, such vehicles tend to experience substantial oscillation about the tipping point indicated at C.

An arc C' is also struck about the point C to pass through the seat assembly 11'. It may be seen from reference to FIG. 2 that the arc C' has a very substantial longitudinal component and a relatively limited vertical component. This arrangement was found to prevent adequate response of the seat to vertical bounce of the vehicle. Further, it was found that the seat was overly responsive to actions of the operator, such as pressing upon brakes or other operating controls (not shown) for the vehicle. Such actions by the operator tended to force the seat rearwardly, thus interfering with proper operation of the vehicle. To overcome this problem, the axes 21' and 22' for the links 21 and 22 are arranged to converge at a point D arranged substantially in longitudinal alignment with the tipping point C while being vertically spaced thereabove to permit motion of the seat frame 13' about an arc D'. It may be seen that the arc D' correlates sufficiently with the arc C' to permit response of the seat to movement of the vehicle about the tipping point C. However, the arc D' also has an increased vertical component so that the seat frame 13' is more responsive, for example, to vertical bounce of the vehicle 81 and facilitates operator control over the vehicle.

Thus, the seat assembly of the present invention has been described above with particular reference to two specific vehicles as illustrated in FIGS. 1 and 2. It is to be noted, as discussed above, that the specific configuration of the quadrilateral support linkage for the seat may tend to vary even within a specific vehicle if a different application is contemplated. For example, in the loader vehicle of FIG. 1, the seat is arranged for oscillation about the oscillation point A. Thus, the operator tends to be isolated from motion of the vehicle during relatively high speed operation of the loader vehicle. If, on the other hand, it is desired to isolate the operator during slow travel of the vehicle over very rough terrain, it might be more desirable to arrange the seat frame 13 for movement along the arc B'. Similarly, the seat arrangement employed in FIG. 2 may also be adaptable for use in substantially different vehicles. It may be noted from FIG. 2 that the seat assembly 11' is located generally toward one end of the vehicle. Such an arrangement would similarly arise, for example, in a truck (not shown) where the operator's station is conventionally located in a forward portion of the truck. Configuration of the quadrilateral support linkage for the seat would correspond with that illustrated in FIG. 2 to the extent that the axes of the links 21' and 22' would tend to converge at a point substantially below the seat assembly, and rearwardly toward or beyond the back of the truck. This would tend to be the case even though the seat frame 13' of FIG. 2 is contemplated for movement about a tipping point C, while a seat in the truck would probably be contemplated for movement about an oscillation point below and toward the rear of the truck.

What is claimed is:

1. An operator seat assembly in a vehicle having a longitudinal axis and an operator station, the seat assembly being disposed in the operator station and comprising a base structure secured to the vehicle, a seat frame for supporting an operator, forward and rearward link means respectively pivoted between said base structure and said seat frame, said rearward link means being effectively longer than said forward link means, said forward and rearward links forming in combination with said seat frame and said base structure to which they are pivotably affixed an unsymmetric quadrilateral having sides of fixed length, said forward and rearward link means being disposed with their respective linear axes tending to remain in substantial convergence adjacent a relatively remote point located below and in longitudinally spaced apart relation forward of the seat assembly, said point of convergence being preselected with reference to the vehicle, and a resilient means effectively interconnected between said seat frame and said base structure for yieldingly resisting movement of said seat frame relative to said base structure.

2. The seat assembly of claim 1 wherein the point of convergence is longitudinally located on the vehicle generally adjacent on oscillation point for the vehicle.

3. The seat assembly of claim 1 wherein the operator station and seat assembly are situated generally adjacent one end of the vehicle, said forward and rearward link means being selected and arranged to locate the point of convergence for their axes toward the other end of the vehicle.

4. The seat assembly of claim 3 wherein the vehicle is a track-type vehicle and the point of convergence is longitudinally located on the vehicle generally adjacent a tipping point for the vehicle.

5. The seat assembly of claim 4 wherein the point of convergence is located generally in longitudinal alignment with and substantially above the tipping point of the vehicle to facilitate movement of the seat frame in response to vertical travel of the vehicle.

6. A vehicular seat assembly comprising a seat assembly base, a seat frame for supporting an operator, first and second links providing the only means for guiding movement of said seat frame relative to said seat assembly base, opposite ends of each link being pivotably affixed to said seat frame and said seat assembly base respectively in order to closely control the path of movement for said seat frame relative to said seat assembly base, said first and second links being further disposed in spaced apart relation with their axes tending to remain in substantial convergence adjacent a preselected point located below and in longitudinally spaced apart relation from the seat assembly in order to limit said seat frame to oscillatory motion about the preselected point, said first and second links forming an unsymmetric quadrilateral having sides of fixed length in combination with said seat assembly base and seat frame to which they are pivotably affixed, and a resilient means effectively interconnected between said seat frame and said seat assembly base for resisting movement of said seat frame along the path of movement established relative to said seat assembly base by said first and second links.

7. The vehicle of claim 6 wherein the interconnection and arrangement of said first and second links further restricts a forward portion of said seat frame to less verticle travel than a rearward portion of said seat frame during forward and rearward movement thereof.

8. The vehicle of claim 6 wherein the preselected point is established with respect to operating and physical characteristics of the vehicle for longitudinal alignment with a reference point relative to the vehicle which experiences minimum vertical movement during operating travel of the vehicle.

9. The seat assembly of claim 6 wherein said resilient means comprises a piston which is slidable in a fluid cylinder in response to relative motion between said seat frame and seat assembly base and a fluid accumulator in communication with one end of the cylinder.

10. The seat assembly of claim 9 wherein said resilient means further comprises cushioning means for increasing resistance to movement of the piston as it approaches one end of the cylinder in response to downward motion of said seat frame toward said seat assembly base.

11. An operator's seat assembly comprising, a base structure, a seat frame for supporting an operator, an interconnecting linkage coupled between said base and seat frame, and resilient means tending to resist movement of said seat frame relative to said base, said resilient means including a fluid cylinder having a piston slidable therein in response to relative motion between said seat frame and base, a fluid accumulator being in communication with one end of said cylinder by means of a first conduit spaced apart from said cylinder end and a second conduit closely adjacent said cylinder end, said second conduit including restrictive means for further resisting movement of said piston as it approaches said cylinder end.

12. The seat assembly of claim 11 further comprising a check valve and parallel restrictive orifice, said check valve permitting fluid from said one cylinder end to enter said accumulator, said parallel restrictive orifice limiting fluid returned from said accumulator to said one cylinder end.

13. The seat assembly of claim 12 further comprising a valve operable in response to movement of said seat frame relative to said base for selectively communicating additional fluid under pressure at a controlled rate to said one cylinder end and for selectively communicating fluid from said one cylinder end to the other end of said cylinder at another controlled rate.

* * * * *

UNITED STATES PATENT OFFICE
CERTIFICATE OF CORRECTION

PATENT NO. : 3,883,172
DATED : May 13, 1975
INVENTOR(S) : James C. Barton, et al It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this twenty-eight Day of October 1975

[SEAL]

Attest:

RUTH C. MASON
Attesting Officer

C. MARSHALL DANN
Commissioner of Patents and Trademarks